United States Patent
Kaeding et al.

(10) Patent No.: US 6,726,991 B2
(45) Date of Patent: Apr. 27, 2004

(54) POROUS POLYMER PARTICLES AND METHOD FOR PREPARATION THEREOF

(75) Inventors: Jeanne E. Kaeding, Rochester, NY (US); Dennis E. Smith, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 40 days.

(21) Appl. No.: 10/237,438

(22) Filed: Sep. 9, 2002

(65) Prior Publication Data

US 2003/0044612 A1 Mar. 6, 2003

Related U.S. Application Data

(63) Continuation-in-part of application No. 09/608,466, filed on Jun. 30, 2000, now Pat. No. 6,475,602.

(51) Int. Cl.[7] .................................................. B32B 5/16
(52) U.S. Cl. .......................... 428/403; 428/407; 525/902
(58) Field of Search ................................. 428/403, 407; 525/902

(56) References Cited

U.S. PATENT DOCUMENTS

| | | | | |
|---|---|---|---|---|
| 5,378,577 A | * | 1/1995 | Smith et al. | 430/138 |
| 5,583,162 A | | 12/1996 | Li et al. | |
| 6,475,602 B1 | * | 11/2002 | Kapusniak et al. | 428/32.34 |
| 6,645,582 B2 | * | 11/2003 | Sadasivan et al. | 428/32.34 |

* cited by examiner

*Primary Examiner*—H. Thi Le
(74) *Attorney, Agent, or Firm*—Harold E. Cole

(57) ABSTRACT

Core/shell particles having a core of a porous polymer and a shell of an inorganic colloid, the inorganic colloid having a median diameter of less than about 0.07 μm, and the core/shell particles having a median diameter of less than about 50 μm.

14 Claims, No Drawings

POROUS POLYMER PARTICLES AND METHOD FOR PREPARATION THEREOF

CROSS REFERENCE TO RELATED APPLICATION

This application is a continuation-in-part of U.S. patent application Ser. No. 09/608,466 by Kapusniak et al., filed Jun. 30, 2000, now U.S. Pat. No. 6,475,602.

FIELD OF THE INVENTION

This invention relates to porous polymer particles. More particularly, this invention relates to porous polymeric particles having a core/shell structure and a method for preparation thereof.

BACKGROUND OF THE INVENTION

The present invention relates to polymer particles, in particular porous polymeric particles having a core/shell structure which are useful as packing materials for liquid chromatography, pigments for ink jet receiving layers, adsorbents, cosmetics, paints, building materials, controlled release devices, pharmaceuticals, and the like.

Porous polymer particles are useful for oral, injectable and implantable devices because they have a long circulation time in the body and are efficient drug, enzyme, and protein carriers. The particles form a porous network capable of retaining large amounts of inert and active substances. Such controlled release delivery systems for drugs have a wide variety of advantages over conventional forms of drug administration. Some of these advantages include: decreasing or eliminating the oscillating drug concentrations found with multiple drug administrations; allowing the possibility of localized delivery of the drug to a desired part of the body; preserving the efficacy of fragile drugs; reducing the need for patient follow-up care; increasing patient comfort and improving patient compliance.

The porous polymer particles must be small in size in order to circulate in the body. A problem with prior art particles is that although small in median size, the quality of the particle size distribution may be inadequate. In particular, there may be a tail of larger particles which can give a gritty feel during oral administration, plug needles used for injection, or inhibit circulation in the body. Extensive and tedious filtration may be required in order to remove these larger particles.

Another problem with prior art particles is that some porous polymer particles may be stabilized by small surfactant molecules or by water-soluble polymers. These prior art stabilizers or emulsifiers are sometimes not desired because they may be toxic or create surface properties on the porous polymer particle which are inappropriate for the application.

Porous polymer particles are also useful as pigments for ink jet receivers. While a wide variety of different types of image-recording elements for use with ink jet devices have been proposed heretofore, there are many unsolved problems in the art and many deficiencies in the known products which have limited their commercial usefulness. One such problem is that larger than desired particles create visible defects.

U.S. Pat. No. 5,583,162 relates to porous crosslinked microbeads, about 10 $\mu$m to about 5 mm in diameter, having cavities joined by interconnecting pores. The microbeads are made by polymerization of high internal phase emulsions where about 70% to about 98% water is dispersed as a discontinuous phase in a continuous monomer phase. Finely-divided, water-insoluble inorganic solids, such as silica, are used as suspending agents for the microbeads. However, the particle size of the water-insoluble inorganic solids is not specified or its importance affecting the particle size distribution of the microbeads.

In addition, the process for making porous crosslinked microbeads described in U.S. Pat. No. 5,583,162 requires two separate shearing steps for forming discontinuous phases and also requires an emulsifier. It would be desirable to provide a process for making such microbeads which only has one shearing step and is free of emulsifiers.

It is an object of this invention to provide porous polymeric particles having a core/shell structure. It is another object of this invention to provide porous polymeric particles having a core/shell structure and narrow particle size distribution. It is another object of this invention to provide a method for preparing porous polymeric particles having a core/shell structure which only has one shearing step and is free of emulsifiers.

SUMMARY OF THE INVENTION

These and other objects are achieved in accordance with the invention which comprises core/shell particles having a core of a porous polymer and a shell of an inorganic colloid, the inorganic colloid having a median diameter of less than about 0.07 $\mu$m, and the core/shell particles having a median diameter of less than about 50 $\mu$m.

Using the invention, porous particles are obtained which have narrower particle size distributions than prior art core/shell particles.

In another embodiment of the invention, a method for preparing core/shell particles having a core of a porous polymer and a shell of an inorganic colloid, comprises:

a) forming a suspension or dispersion of ethylenically unsaturated monomer droplets containing a crosslinking monomer and a porogen in an aqueous medium containing an inorganic colloid; and b) polymerizing the monomer to form core/shell particles having a core of a porous polymer and a shell of an inorganic colloid.

By use of the method of the invention, core/shell particles are obtained which are not limited to inorganic colloids having a median diameter of less than about 0.07 $\mu$m or core/shell particles having a median diameter of less than about 50 $\mu$m.

DETAILED DESCRIPTION OF THE INVENTION

As noted above, the core/shell particles of this invention have a core of porous polymer. This core can be porous beads of essentially spherical shape, porous irregularly shaped particles, or is an aggregate of emulsion particles. Preferred are porous beads. By porous is meant polymers that have voids. They may also be thought of as cavities joined by interconnecting pores.

Suitable cores of a porous polymer used in the invention comprise, for example, acrylic resins, styrenic resins, or cellulose derivatives, such as cellulose acetate, cellulose acetate butyrate, cellulose propionate, cellulose acetate propionate, and ethyl cellulose; polyvinyl resins such as polyvinyl chloride, copolymers of vinyl chloride and vinyl acetate and polyvinyl butyral, polyvinyl acetal, ethylene-vinyl acetate copolymers, ethylene-vinyl alcohol copolymers, and ethylene-allyl copolymers such as ethylene-allyl alcohol copolymers, ethylene-allyl acetone copolymers, ethylene-allyl benzene copolymers, ethylene-allyl ether copolymers, ethylene acrylic copolymers and polyoxy-methylene; polycondensation polymers, such as, polyesters, including polyethylene terephthalate, polybutylene terephthalate, polyurethanes and polycarbonates.

In a preferred embodiment of the invention, the porous polymers suitable for the core are made from a styrenic or an acrylic monomer. Any suitable ethylenically unsaturated monomer or mixture of monomers may be used in making such styrenic or acrylic polymers. There may be used, for example, styrenic compounds, such as styrene, vinyl toluene, p-chlorostyrene, vinylbenzylchloride or vinyl naphthalene; or acrylic compounds, such as methyl acrylate, ethyl acrylate, n-butyl acrylate, n-octyl acrylate, 2-chloroethyl acrylate, phenyl acrylate, methyl-α-chloroacrylate, methyl methacrylate, ethyl methacrylate, butyl methacrylate; and mixtures thereof. In another preferred embodiment, methyl methacrylate or styrene is used.

Typical crosslinking monomers used in making the porous polymer core used in the invention are aromatic divinyl compounds such as divinylbenzene, divinylnaphthalene or derivatives thereof; diethylene carboxylate esters and amides such as ethylene glycol dimethacrylate, diethylene glycol diacrylate, and other divinyl compounds such as divinyl sulfide or divinyl sulfone compounds. Divinylbenzene and ethylene glycol dimethacrylate are especially preferred. The porous polymer core has a degree of crosslinking of about 27 mole % or greater, preferably about 50 mole %, and most preferably about 100 mole %. The degree of crosslinking is determined by the mole % of multifunctional crosslinking monomer that is incorporated into the porous polymeric particles.

The core of porous polymer used in this invention can be prepared, for example, by pulverizing and classification of porous organic compounds, by emulsion, suspension, and dispersion polymerization of organic monomers, by spray drying of a solution containing organic compounds, or by a polymer suspension technique which consists of dissolving an organic material in a water immiscible solvent, dispersing the solution as fine liquid droplets in aqueous solution, and removing the solvent by evaporation or other suitable techniques. The bulk, emulsion, dispersion, and suspension polymerization procedures are well known to those skilled in the polymer art and are taught in such textbooks as G. Odian in "Principles of Polymerization", 2nd Ed. Wiley (1981), and W. P. Sorenson and T. W. Campbell in "Preparation Method of Polymer Chemistry", 2nd Ed, Wiley (1968).

Techniques to synthesize porous polymer particles useful as cores in this invention are taught, for example, in U.S. Pat. Nos. 5,840,293; 5,993,805; 5,403,870; and 5,599,889, and Japanese Kokai Hei 5[1993]-222108, the disclosures of which are hereby incorporated by reference. For example, an inert fluid or porogen may be mixed with the monomers used in making the porous polymer particles. After polymerization is complete, the resulting polymeric particles are, at this point, substantially porous because the polymer has formed around the porogen thereby forming the pore network. This technique is described more fully in U.S. Pat. No. 5,840,293 referred to above.

A preferred method of preparing the porous polymer cores used in this invention includes forming a suspension or dispersion of ethylenically unsaturated monomer droplets containing the crosslinking monomer and a porogen in an aqueous medium, polymerizing the monomer to form solid, porous polymers, and optionally removing the porogen by vacuum stripping. The porous polymers thus prepared have a porosity as measured by a specific surface area of about 35 $m^2/g$ or greater, preferably 100 $m^2/g$ or greater. The surface area is usually measured by B.E.T. nitrogen analysis known to those skilled in the art.

The porous polymer cores have a shell of an inorganic colloid having a median diameter of less than about 0.07 $\mu$m. Any suitable inorganic colloid can be used to form the shell, such as, for example, silica, alumina, alumina-silica, tin oxide, titanium dioxide, zinc oxide, mixtures thereof and the like. Colloidal silica is preferred for several reasons including ease of preparation of the core/shell particles and commercial availability at low cost.

Any suitable method of preparing a core of porous polymer surrounded by a shell of an inorganic colloid may be used to prepare the core/shell particles of this invention. For example, suitably sized porous polymers may be passed through a fluidized bed or heated moving or rotating fluidized bed of inorganic colloid, the temperature of the bed being such to soften the surface of the porous polymers thereby causing the inorganic colloid to adhere to the porous polymer surface. Another technique suitable for preparing core/shell particles having a core of a porous polymer and a shell of inorganic colloid is to spray dry the particles from a solution of the polymeric material in a suitable solvent and then before the polymer particles solidify completely, passing the particles through a zone of inorganic colloid wherein the coating of the particles with a layer of the inorganic colloid takes place. Another method to coat the porous polymer core with a layer of inorganic colloid is by Mechano Fusion.

A preferred method of preparing the core/shell particles in accordance with this invention is by limited coalescence as described in U.S. Pat. Nos. 5,288,598; 5,378,577; 5,563,226 and 5,750,378, the disclosures of which are incorporated herein by reference. In limited coalescence, a polymerizable monomer or monomers, along with a porogen, are added to an aqueous medium containing a particulate suspension of inorganic colloid to form a discontinuous (oil droplets) phase in a continuous (water) phase. The mixture is subjected to shearing forces by agitation, homogenization and the like to reduce the size of the droplets. After shearing is stopped, an equilibrium is reached with respect to the size of the droplets as a result of the stabilizing action of the inorganic colloid stabilizer in coating the surface of the droplets and then polymerization is completed to form an aqueous suspension of a porous polymer in an aqueous phase having a uniform layer thereon of inorganic colloid.

The quantity of the inorganic colloid stabilizer to use depends upon the size of the particles of the inorganic colloid and also upon the size of the monomer droplets desired. Thus, as the size of the droplets are made smaller by high shear agitation, the quantity of inorganic colloid stabilizer is varied to prevent uncontrolled coalescence of the droplets and to achieve uniform size and narrow size distribution of the polymer particles that result.

Limited coalescence with inorganic colloids smaller than 0.07 $\mu$m provides core/shell particles having a narrow size distribution and a predetermined median diameter anywhere within the range of from 0.5 $\mu$m to about 50 $\mu$m, preferably from about 1 $\mu$m to about 10 $\mu$m. Median diameter is defined as the statistical average of the measured particle size distribution on a volume basis. For further details concerning median diameter measurement, see T. Allen, "Particle Size Measurement", 4th Ed., Chapman and Hall, (1990). These core/shell particles should preferably have a Width Index, which is a measure of the particle size distribution as will be described later, of less than 1.45.

The following examples further illustrate the invention.

EXAMPLES

Particle 1 (Invention)—Use of 0.02 μm Colloidal Silica as Shell

To a beaker were added the following ingredients: 105 g ethylene glycol dimethacrylate, 245 g toluene as a porogen, and 1.6 g 2,2'-azobis(2,4-dimethylvaleronitrile) (Vazo 52® from DuPont Corp.). The ingredients were stirred until all the solids were dissolved.

In a separate beaker, an aqueous phase was made by combining 545 g distilled water, 2.9 g of a low molecular weight copolymer of methylaminoethanol and adipic acid, 4.2 g sodium acetate trihydrate, and 2.1 g acetic acid. Next, 35 g Ludox TM® (50% by weight dispersion of 0.02 μm colloidal silica in water from DuPont Corp.) was added with stirring.

The aqueous and monomer phases were combined and then stirred with a marine prop type agitator for 5 minutes to form a crude emulsion. The crude emulsion was passed through a Gaulin® colloid mill set at 3600 rev./min., 0.25 mm gap, and 3.2 kg/min throughput. The resulting monomer droplet dispersion was placed into a 1-liter three-necked round bottom flask. The flask was placed in a 50° C. constant temperature bath and the dispersion stirred at 140 rev./min. under positive pressure nitrogen for 16 hours to polymerize the monomer droplets into porous polymeric particles. Toluene and some water were distilled off under vacuum at 60° C.

The median size of the core/shell particles was measured by a particle size analyzer, Horiba LA-920®, and is listed in Table 1 below. A dried portion of the dispersion, analyzed by B.E.T. Multipoint using a Quantachrome Corp., NOVA® analyzer had a specific surface area of 373 m²/g and a total pore volume of 0.675 mL/g. The Width Index for the core/shell particles was determined from the Horiba LA-920® analysis and is also listed in Table 1 below. The Width Index is a measure of the breadth of the particle size distribution. The following equation describes the Width Index, $$\frac{\frac{D_{50}}{D_{16}} + \frac{D_{84}}{D_{50}}}{2}$$

where $D_{16}$ is the diameter where 16% of the total mass of particles is smaller; $D_{50}$ is the diameter where 50% of the total mass of particles is smaller; and $D_{84}$ is the diameter where 84% of the total mass of particles is smaller. Thus, the smaller the Width Index the narrower the distribution, with about 1.45 or less being acceptable.

Particle 2 (Invention)—Use of 0.06 μm Colloidal Silica as Shell

The same procedure as in Particle 1 was followed except 35 g of Nalcoag 1060® (50% wt. dispersion of silica in water from ONDEO Nalco Company) was used instead of Ludox TM®.

Particle C-1 (Comparative)—Use of 0.2 μm Colloidal Silica Aggregates as Shell

The same procedure as in Particle 1 was followed except 58.3 g Cab-O-Sperse PC001® (30% wt. dispersion of fumed silica in water from Cabot Corp.) was used instead of Ludox TM®.

Particle C-2 (Comparative)—Use of 0.075 μm Colloidal Silica as Shell

The same procedure as in Particle 1 was followed except 43.75 g Nalco 2329® (40% wt. dispersion of 0.075 μm colloidal silica in water from ONDEO Nalco Company) was used instead of Ludox TM®.

Particle C-3 (Comparative)—Use of 0.3 μm Silica Gel as Shell

The same procedure as in Particle 1 was followed except 87.5 g Sylojet 703A® (20% wt. dispersion of 0.3 μm silica gel in water from Grace-Davidson) was used instead of Ludox TM®.

Particle C-4 (Comparative)—Use of >5 μm Aluminum Silicate as Shell

The same procedure as in Particle 1 was followed except, 17.5 g Kaolin® (>5 μm aluminum silicate dry powder from Alfa Corp.) was used instead of Ludox TM®.

TABLE 1

| Particles | Median Size (μm) | Width Index |
|---|---|---|
| 1 | 5.3 | 1.41 |
| 2 | 7.9 | 1.40 |
| C-1 | 10.3 | 1.49 |
| C-2 | 10.4 | 1.62 |
| C-3 | 9.6 | 1.59 |
| C-4 | 64.6 | 1.34 |

The above results show that the core/shell particles of the invention made with an inorganic colloid having a median diameter of less than about 0.07 μm, result in core/shell particles having a median diameter of less than about 50 μm and a Width Index of less than about 1.45. Comparative core/shell particles made with an inorganic colloid having a median diameter larger than about 0.07 μm result in core/shell particles having a median diameter larger than 50 μm or a Width Index greater than about 1.45.

This invention has been described with particular reference to preferred embodiments thereof but it will be understood that modifications can be made within the spirit and scope of the invention.

What is claimed is:

1. Core/shell particles having a core of a porous polymer and a shell of an inorganic colloid, said inorganic colloid having a median diameter of less than about 0.07 μm, and said core/shell particles having a median diameter of less than about 50 μm.

2. The particles of claim 1 wherein the median diameter is less than about 10 μm.

3. The particles of claim 1 wherein said core of said porous polymer is made from a styrenic monomer or an acrylic monomer.

4. The particles of claim 3 wherein said acrylic monomer comprises methyl methacrylate or ethylene glycol dimethacrylate.

5. The particles of claim 3 wherein said styrenic monomer comprises styrene or divinylbenzene.

6. The particles of claim 1 wherein said core of said porous polymer is cross-linked to a degree of crosslinking of least about 27 mole % or greater.

7. The particles of claim 1 wherein said core of said porous polymer is cross-linked to a degree of crosslinking of least about 50 mole % or greater.

8. The particles of claim 1 wherein the porosity of said porous polymer core is achieved by mixing a porogen with the monomers used to make said polymeric particles, dispersing the resultant mixture in water, and polymerizing said monomers to form said porous polymeric particles.

9. The core/shell particles of claim 1 wherein the surface area is about 35 m²/g or greater.

10. The core/shell particles of claim 1 wherein the surface area is about 100 $m^2/g$ or greater.

11. The particles of claim 1 wherein said inorganic colloid is colloidal silica.

12. A method for preparing core/shell particles according to claim 1, comprising:
   a) forming a suspension or dispersion of ethylenically unsaturated monomer droplets containing a crosslinking monomer and a porogen in an aqueous medium containing an inorganic colloid; and
   b) polymerizing said monomer to form core/shell particles having a core of a porous polymer and a shell of an inorganic colloid.

13. The method of claim 12 wherein said porogen is removed.

14. The method of claim 12 wherein said inorganic colloid coats the surface of said monomer droplets.

* * * * *